(12) United States Patent
Kipping et al.

(10) Patent No.: US 8,152,148 B2
(45) Date of Patent: Apr. 10, 2012

(54) DEVICE FOR POSITIONING COMPONENTS

(75) Inventors: Josef Kipping, Schmelz (DE); Rüdiger Schütz, Schmelz (DE)

(73) Assignee: ThyssenKrupp Drauz Nothelfer GmbH, Heilbronn (DE)

( * ) Notice: Subject to any disclaimer, the term of this patent is extended or adjusted under 35 U.S.C. 154(b) by 398 days.

(21) Appl. No.: 12/446,336

(22) PCT Filed: Oct. 26, 2007

(86) PCT No.: PCT/EP2007/009292
§ 371 (c)(1),
(2), (4) Date: Apr. 20, 2009

(87) PCT Pub. No.: WO2008/061604
PCT Pub. Date: May 29, 2008

(65) Prior Publication Data
US 2010/0320667 A1    Dec. 23, 2010

(30) Foreign Application Priority Data
Nov. 21, 2006  (DE) .......................... 10 2006 055 103

(51) Int. Cl.
*B23Q 3/18* (2006.01)
(52) U.S. Cl. ........................................................ 269/32
(58) Field of Classification Search ............. 269/32, 269/45, 55, 57–59, 329; 74/106
See application file for complete search history.

(56) References Cited

U.S. PATENT DOCUMENTS

| 5,481,936 | A | | 1/1996 | Yanagisawa | |
|---|---|---|---|---|---|
| 5,634,629 | A | * | 6/1997 | Blatt | 269/32 |
| 5,799,932 | A | * | 9/1998 | Blatt | 269/32 |
| 5,996,984 | A | * | 12/1999 | Takahashi | 269/32 |
| 6,070,864 | A | * | 6/2000 | Crorey | 269/32 |
| 6,488,273 | B2 | * | 12/2002 | Sawdon et al. | 269/20 |
| 2009/0283948 | A1 | * | 11/2009 | Fukui et al. | 269/32 |

FOREIGN PATENT DOCUMENTS
DE     295 04 267     6/1995
JP     57 061445      4/1982

* cited by examiner

*Primary Examiner* — David B Thomas
(74) *Attorney, Agent, or Firm* — McGlew and Tuttle, P.C.

(57) ABSTRACT

A device for positioning components, in particular for use in bodymaking of the motor vehicle industry, is provided with a rotatable receiving plate (1) for the components and a drive device for turning the receiving plate (1) about an axis of rotation (18), preferably arranged perpendicularly in relation to the plane of the receiving plate (1). A drive device is provided with a toggle clamping device (5) known per se, wherein a linear drive (6) is connected via a toggle lever to a swivel pin (16). The swivel pin (16) is positively and/or non-positively connected via a receptacle (15) to the receiving plate (1) and provides an adjustable swivelling movement of the receiving plate (1) into a locked, advanced end position.

20 Claims, 4 Drawing Sheets

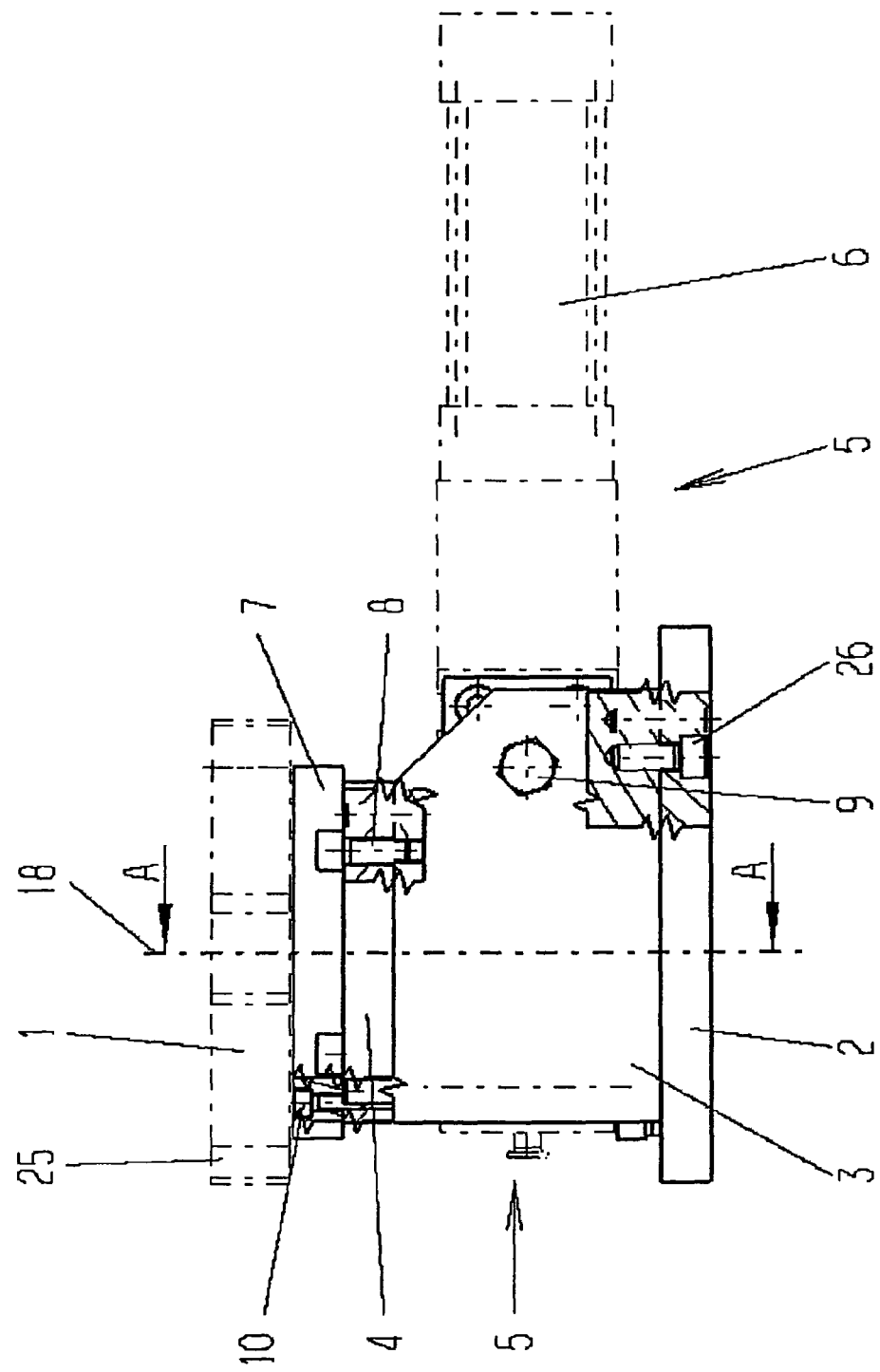

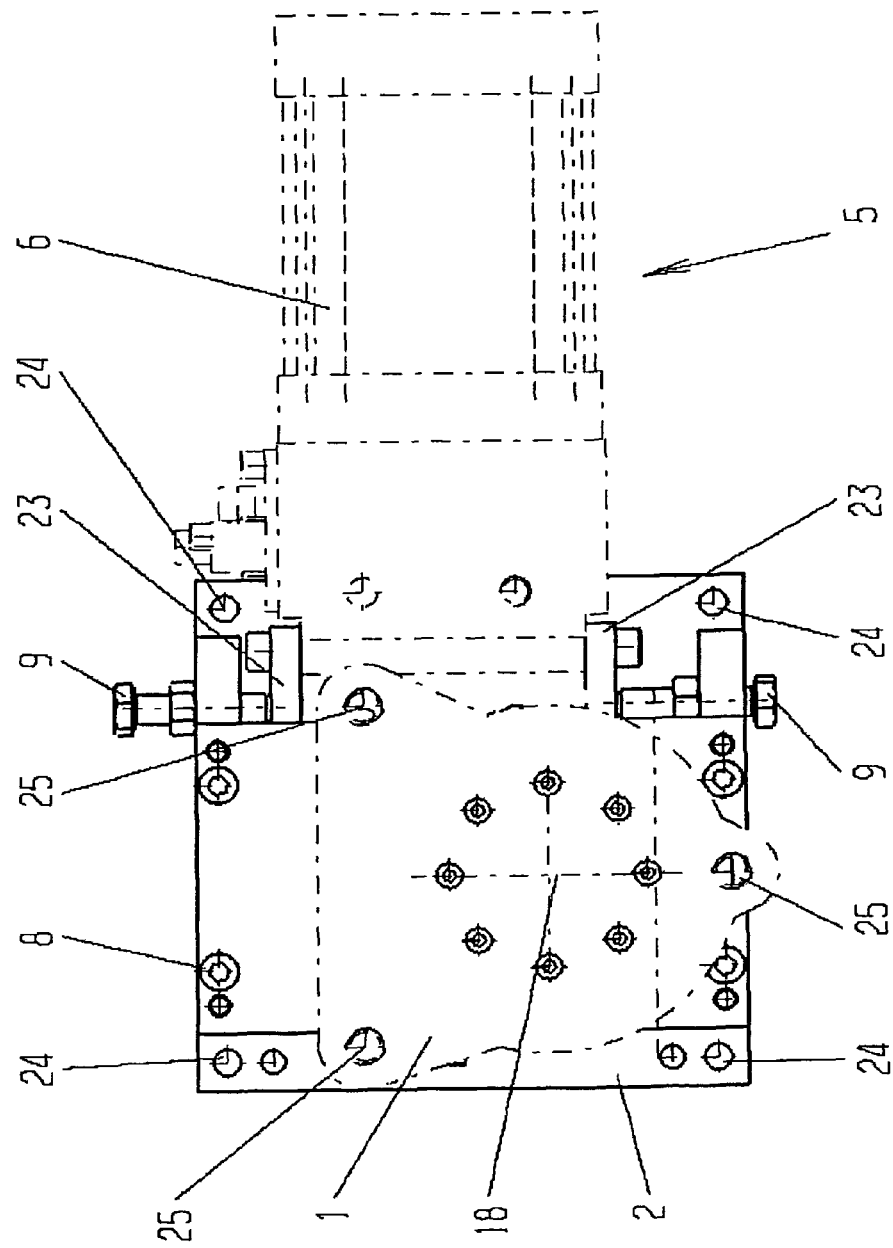

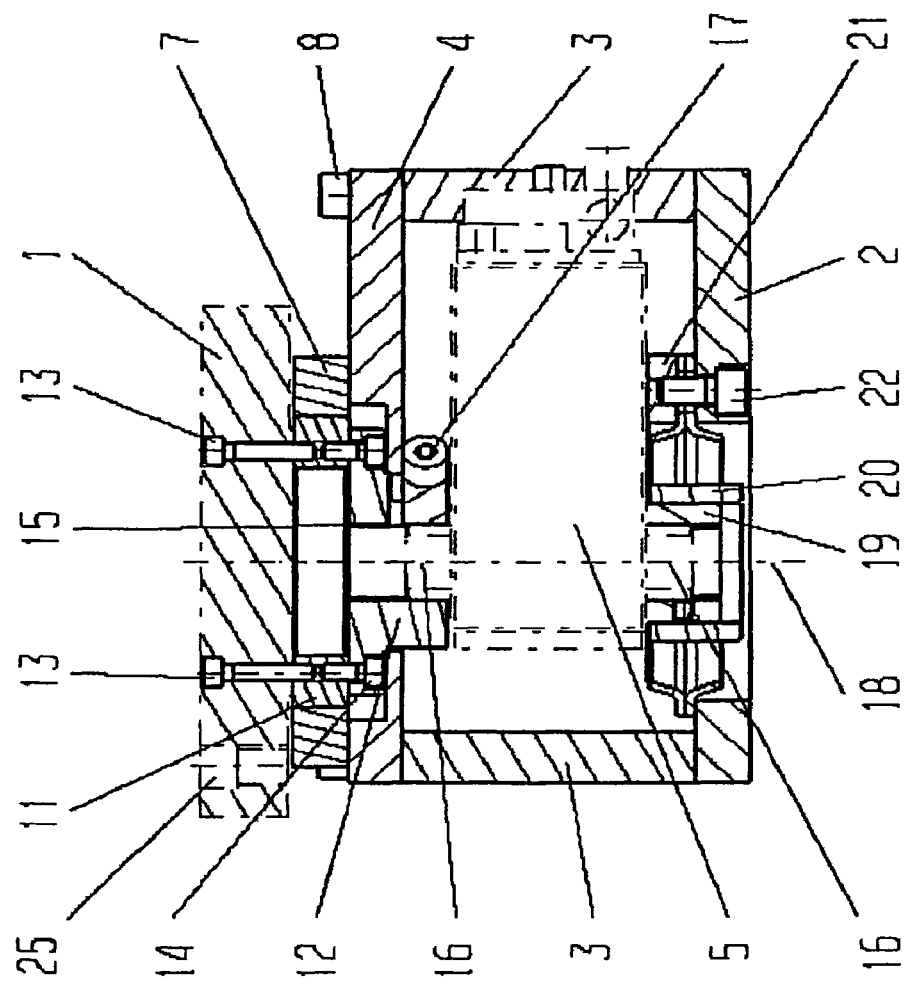

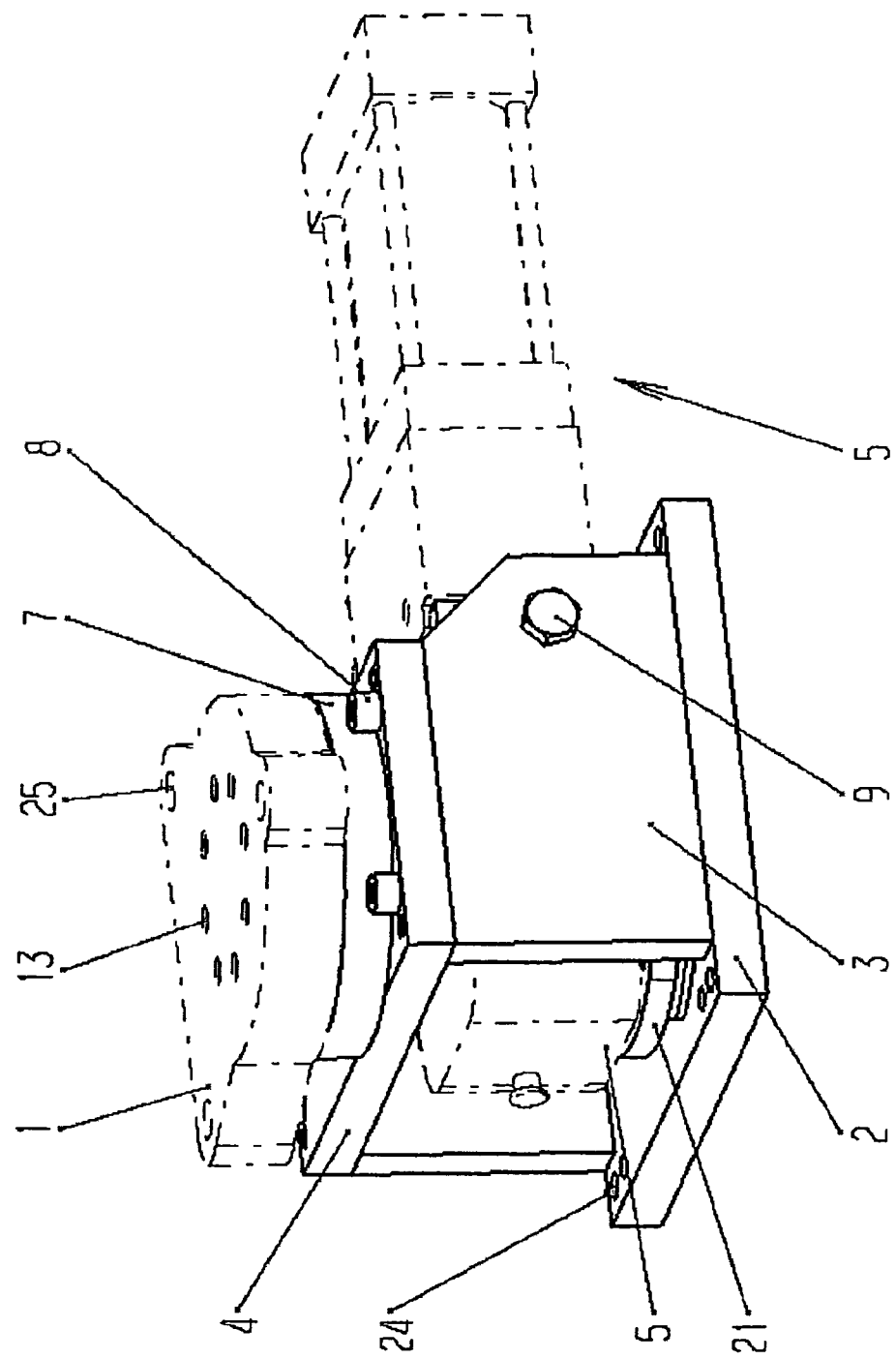

DEVICE FOR POSITIONING COMPONENTS

CROSS REFERENCE TO RELATED APPLICATIONS

This application is a United States National Phase application of International Application PCT/EP2007/009292 and claims the benefit of priority under 35 U.S.C. §119 of German Patent Application DE 10 2006 055 103.6 filed Nov. 21, 2006, the entire contents of which are incorporated herein by reference.

FIELD OF THE INVENTION

The invention relates to a device for positioning components, in particular for use in bodymaking of the motor vehicle industry, with a rotatable receiving plate for the components and a drive device for turning the receiving plate about an axis of rotation, preferably arranged perpendicularly in relation to the plane of the receiving plate.

BACKGROUND OF THE INVENTION

In motor vehicle industry, rotating and swivelling devices are often needed to handle and to machine various components, particularly for assembly of various components, by way of which certain work pieces and components are brought into a machining and/or assembly position. For example, these devices can be manually turned into a distinct position and firmly positioned there, but they can also be swivelled to and fro, for example by means of pneumatic cylinders. However, specific pneumatic cylinders each having different strokes must be available to account for different swivelling angles.

DE 295 04 267 VI discloses an exemplary toggle clamping device in which a piston to be charged by pressure at both sides in alternating mode is guided in a longitudinally sliding arrangement within a cylinder to serve as linear drive and in which the piston rod at the free end within the casing of the toggle clamping device is connected to a toggle lever assembly which a clamping arm is assigned to. In particular, the toggle lever assembly is comprised of a swivelling pin supported within a casing and executing a rotating movement when the linear drive is actuated. The swivelling pin extends at a right angle to the longitudinal direction of the piston.

SUMMARY OF THE INVENTION

It is an object of the present invention to propose a device for positioning and swivelling of components about optionally adjustable swivelling angles that does not call for a frequent exchange of swivel drives.

To solve this task the drive device is comprised of a toggle clamping device known per se, wherein a linear drive is linked via a toggle lever to a swivelling pin and wherein the swivelling pin is positively or non-positively connected via a receptacle to a receiving plate and provides an adjustable swivelling movement of the receiving plate into a locked, advanced end position. Applying actually known toggle clamping devices as drive for defined swivelling movements of the receiving plate particularly bears the advantage that the components can be brought into an exactly positioned locked end position and that it is possible to adjust the swivelling angle in a simple manner at the linear drive of the toggle clamping device. Accordingly, it is in particular possible to adjust the angle infinitely, adjusting angles from 1° to 135°, preferably from 15° to 135°. Besides, the toggle clamping device also renders it possible to pick-up piston positions.

The actually known toggle clamping device is easy to connect in detachable arrangement by means of clamping bolts to the inventive device. Power transmission is preferably realized via an externally profiled swivelling pin, more particular via a square bolt, which is axially brought into an appropriate receptacle and maintained in the exact position via clamping bolts. The receptacle is directly or indirectly connected to the receiving plate, more particularly it is bolted, so that the receiving plate, too, is appropriately turned and/or swivelled on actuation of the linear drive in the toggle clamping device and on turning the swivelling pin. Preferably, a cross roller bearing is arranged between the stationary casing and the receiving plate.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a side view of the inventive device;
FIG. 2 is a top view of the device as per FIG. 1;
FIG. 3 is a section according line A-A of FIG. 1; and
FIG. 4 is a perspective view of the inventive device.

DESCRIPTION OF THE PREFERRED EMBODIMENTS

Referring to the drawings in particular, The inventive receiving plate 1, which can be rotated and/or swivelled, is comprised of bores 25 to fasten components to be machined and/or mounted, with it being possible to bolt an actually known clamping bracket to said receiving plate 1. These clamping brackets then hold the relevant components. The casing of the inventive device is comprised of a base plate 2, side walls 3, and a covering plate 4, which are connected to each other by appropriate bolts 8 and 26. The actually known toggle lever clamping device 5 is brought from one side into this bilateral casing and exactly positioned and fixed by means of clamping bolts 9 and thrust plates 23. The toggle lever clamping device 5 is comprised of a linear drive 6 which is shown in FIGS. 1 and 2 in dashed lines only, said linear drive being moved clockwise and anti-clockwise in horizontal direction according to the views shown in FIGS. 1 and 2. Connected to said linear drive in an actually known manner is a toggle lever assembly not shown here, which swivel pins 16 supported in said toggle lever clamping device 5 belong to.

According to FIG. 3, said swivel pin 16 has a vertical rotating axis 18. It is profiled on its outside and more particularly it is designed and built as a square bolt which protrudes at its upper side into the receptacle 15 of the power transmission element 12 and connected there in a positively and non-positively locked manner to the power transmission element 12. The power transmission element 12, in turn, is connected via bolt 14 to the inner ring 11 of a cross roller bearing. This inner ring 11 is bolted through bolt 13 to the receiving plate 1, so that swivel pin 16, power transmission element 12, inner ring 11, and receiving plate 1 are firmly connected to each other and are rotated in the same manner. The outer ring 7 firmly connected by means of bolts 10 to cover plate 4 belongs to said inner ring 11. The lower section of FIG. 3 shows the lower end of swivel pin 16 which protrudes into an adapter sleeve 19 and which has a circular outer diameter and in which bearing 20 is guided which in turn is connected to the assembly plate 21. The assembly plate 21 is connected trough bolt 22 with base plate 2. Moreover, base plate 2 can be bolted through bores 24 to any arbitrary base not shown here.

While specific embodiments of the invention have been described in detail to illustrate the application of the principles of the invention, it will be understood that the invention may be embodied otherwise without departing from such principles.

The invention claimed is:

1. A device for positioning components, for use in body-making of the motor vehicle industry, the device comprising:
    a rotatable receiving plate for the components; and
    a drive device for turning the receiving plate about an axis of rotation, the drive being arranged perpendicularly in relation to the plane of the receiving plate, the drive device comprising a toggle clamping device and a linear drive connected via a toggle lever to a swivel pin and the swivel pin is positively and/or non-positively connected via a receptacle to the receiving plate and provides an adjustable swivelling movement of the receiving plate into a locked, advanced end position.

2. A device as defined in claim 1, wherein the receiving plate can be swivelled about an angle of 1° to 135°.

3. A device as defined in claim 2, wherein the toggle clamping device is mounted by means of clamping bolt in a partly open casing of the device in a detachable arrangement.

4. A device as defined in claim 2, wherein the swivel pin is profiled or configured as a square bolt and can be brought into an appropriate receptacle to enable power transmission.

5. A device as defined in claim 1, wherein the toggle clamping device is mounted by means of clamping bolt in a partly open casing of the device in a detachable arrangement.

6. A device as defined in claim 5, wherein the swivel pin is profiled or configured as a square bolt and can be brought into an appropriate receptacle to enable power transmission.

7. A device as defined in claim 1, wherein the swivel pin is profiled or configured as a square bolt and can be brought into an appropriate receptacle to enable power transmission.

8. A device as defined in claim 1, wherein the receiving plate is supported in a cross roller bearing.

9. A device as defined in claim 1, wherein the swivelling movement of said receiving plate is infinitely adjustable by varying the stroke of said linear drive.

10. A device in accordance with claim 1, wherein said axis of rotation extends in a vertical direction with respect to said linear drive, said swivel pin being rotatable about said axis of rotation.

11. A device in accordance with claim 1, wherein said drive device comprises a power transmission element, said power transmission element comprising said receptacle, said power transmission element being connected to said rotatable receiving plate.

12. A device in accordance with claim 11, wherein said drive device comprises a cross roller bearing, said cross roller bearing comprising an inner ring, said power transmission element being connected to said inner ring, said inner ring being connected to said rotatable receiving plate.

13. A device in accordance with claim 12, wherein said swivel pin, said inner ring and said power transmission element rotate about said axis of rotation.

14. A device in accordance with claim 1, wherein a clamping bracket is connected to said rotatable receiving plate for holding the components.

15. A device for positioning components, for use in body-making of the motor vehicle industry, the device comprising:
    a rotatable receiving plate for the components; and
    a drive device rotating the receiving plate about an axis of rotation, said drive device comprising a swivel pin, a toggle clamping device, a power transmission element and a linear drive, said power transmission element comprising a receptacle, said swivel pin being connected to said linear drive, said swivel pin and said power transmission element being rotatable about said axis of rotation, said swivel pin being arranged perpendicular to a receiving plane of said receiving plate, said swivel pin being positively and/or non-positively connected to the receiving plate via said receptacle, wherein said receiving plate is rotated into a locked, advanced end position via said drive device.

16. A device in accordance with claim 15, wherein said axis of rotation extends in a vertical direction with respect to said linear drive.

17. A device in accordance with claim 15, wherein said power transmission element is connected to said rotatable receiving plate.

18. A device in accordance with claim 17, wherein said drive device comprises a cross roller bearing, said cross roller bearing comprising an inner ring, said power transmission element being connected to said inner ring, said inner ring being connected to said rotatable receiving plate.

19. A device in accordance with claim 18, wherein said inner ring rotates about said axis of rotation.

20. A device in accordance with claim 15, wherein a clamping bracket is connected to said rotatable receiving plate for holding the components, said swivel pin being arranged perpendicular to said toggle clamping device and said linear drive.

* * * * *